(12) United States Patent
Adams et al.

(10) Patent No.: US 8,489,684 B2
(45) Date of Patent: Jul. 16, 2013

(54) SYSTEM AND METHOD FOR IMAGE INCLUSION IN E-MAIL MESSAGES

(75) Inventors: Neil Patrick Adams, Waterloo (CA); Raymond Paul Vander Veen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1432 days.

(21) Appl. No.: 11/671,540

(22) Filed: Feb. 6, 2007

(65) Prior Publication Data
US 2008/0189370 A1    Aug. 7, 2008

(51) Int. Cl.
*G06F 15/16*    (2006.01)

(52) U.S. Cl.
USPC ............ 709/205; 709/203; 709/206; 709/207

(58) Field of Classification Search
USPC ................. 709/206, 207, 205, 226, 228, 232, 709/246
See application file for complete search history.

(56) References Cited

U.S. PATENT DOCUMENTS

| | | | |
|---|---|---|---|
| 4,582,956 A | 4/1986 | Doughty | |
| H001714 H | 3/1998 | Partridge, III | |
| 5,889,852 A | 3/1999 | Rosecrans et al. | |
| 5,907,604 A | 5/1999 | Hsu | |
| 6,157,954 A * | 12/2000 | Moon et al. | 709/228 |
| 6,675,008 B1 | 1/2004 | Paik et al. | |
| 7,013,131 B2 | 3/2006 | Lee et al. | |
| 7,046,994 B1 | 5/2006 | Padawer et al. | |
| 7,155,211 B2 | 12/2006 | Mun et al. | |
| 7,177,627 B2 | 2/2007 | Melaku et al. | |
| 7,240,099 B2 * | 7/2007 | Miyazaki et al. | 709/213 |
| 7,596,605 B2 * | 9/2009 | Sung et al. | 709/206 |
| 7,636,792 B1 * | 12/2009 | Ho | 709/246 |
| 7,933,587 B1 * | 4/2011 | Swan | 455/412.1 |
| 7,949,113 B2 * | 5/2011 | Tysowski et al. | 379/142.04 |
| 7,984,098 B2 * | 7/2011 | Enete et al. | 709/204 |
| 8,005,904 B2 * | 8/2011 | Yokoyama et al. | 709/206 |
| 2002/0016818 A1 * | 2/2002 | Kirani et al. | 709/203 |
| 2002/0049836 A1 | 4/2002 | Shibuya | |
| 2003/0090498 A1 * | 5/2003 | Schick et al. | 345/661 |

(Continued)

FOREIGN PATENT DOCUMENTS

| | | |
|---|---|---|
| EP | 1523160 A1 | 4/2005 |
| EP | 1583302 A2 | 10/2005 |
| WO | 2004017596 A1 | 2/2004 |

OTHER PUBLICATIONS

Extended European Search Report issued on Jul. 4, 2007 in connection with EP07101828.7.

*Primary Examiner* — Michael Won
(74) *Attorney, Agent, or Firm* — Ridout & Maybee LLP (57) ABSTRACT

While populating an e-mail message with, among other details, an e-mail address for a receiver, an image of the sender is included as part of the e-mail message. Advantageously, at a device in use to execute an e-mail client application on behalf of the receiver, the e-mail client application may automatically add the included image to an address book entry associated with the identity of the sender. Alternatively, the user may be prompted to allow the association of the image with the address book entry of the sender of the message. Later, upon receiving an incoming call from the sender with corresponding CLID information, the call display application may perform a lookup of the CLID information and display the image associated, in the address book, with the sender.

15 Claims, 6 Drawing Sheets

U.S. PATENT DOCUMENTS

| | | | |
|---|---|---|---|
| 2004/0001091 A1* | 1/2004 | Kressin | 345/753 |
| 2004/0003117 A1* | 1/2004 | McCoy et al. | 709/246 |
| 2005/0055627 A1* | 3/2005 | Lloyd et al. | 715/505 |
| 2005/0143136 A1* | 6/2005 | Lev et al. | 455/566 |
| 2006/0052091 A1 | 3/2006 | Onyon et al. | |
| 2006/0075050 A1* | 4/2006 | Kanatani et al. | 709/206 |
| 2006/0168012 A1* | 7/2006 | Rose et al. | 709/206 |
| 2006/0168060 A1* | 7/2006 | Briand et al. | 709/206 |
| 2006/0183491 A1* | 8/2006 | Gundu et al. | 455/518 |
| 2006/0293905 A1* | 12/2006 | Ramanathan et al. | 705/1 |
| 2007/0174394 A1* | 7/2007 | Jayaweera | 709/206 |
| 2007/0250583 A1* | 10/2007 | Hardy et al. | 709/206 |
| 2008/0014906 A1* | 1/2008 | Tysowski et al. | 455/412.1 |
| 2008/0320396 A1* | 12/2008 | Mizrachi et al. | 715/744 |
| 2009/0103825 A1* | 4/2009 | Wang et al. | 382/250 |

\* cited by examiner

SYSTEM AND METHOD FOR IMAGE INCLUSION IN E-MAIL MESSAGES

FIELD OF THE INVENTION

The present application relates generally to transmitting e-mail messages and, more specifically, to a system and method for image inclusion in e-mail messages before transmission.

BACKGROUND OF THE INVENTION

Users of mobile communication devices with reasonably sophisticated personal information management (PIM) applications have an option of associating a digital image with the information in each entry in an address book portion of the PIM application. This option provides an advantage in that users can associate an image of a face, for instance, with an address book entry. This may be of particular use for a user with an extraordinarily large number of entries in the address book. Where a telephony application is available on such a mobile communication device, and a telephone network to which the mobile communication device connects provides calling line identification (CLID) information, the mobile communication device may enhance a call display application. Upon receiving an incoming call with corresponding CLID information, the call display application may perform a lookup of the destination number and/or name provided in the CLID information and display the image (if any) associated, in the address book, with the destination number and/or name. Names for this lookup and display feature include "Picture Caller ID" and "Photo Caller ID".

However, while Picture Caller ID is a popular feature, there remains a need for an efficient manner by which to distribute digital images for associating with address book entries and for use with Picture Caller ID.

BRIEF DESCRIPTION OF THE DRAWINGS

Reference will now be made to the drawings, which show by way of example, embodiments of the invention, and in which.

DETAILED DESCRIPTION OF THE EMBODIMENTS

Before sending a message to an e-mail server, which message includes an outgoing e-mail message, an e-mail client includes a data-inclusion indicator in the message. The e-mail server that receives the message recognizes the data-inclusion indicator and, responsively, includes sender-specific data before forwarding the e-mail message toward its destination. In the event that the e-mail server can determine that the sender-specific data has previously been transmitted to the destination, the e-mail server may elect not to include the sender-specific data. In the event that the e-mail server can determine that the attached image has not previously been transmitted to the destination, the e-mail server may, given previously acquired criteria for the destination device, amend the sender-specific data to meet the criteria before sending the e-mail message to the destination device. When a device at the destination receives the e-mail message with an image included, the image may be automatically imported into the address book associated with the user of the device, associated with the address book entry of the sender of the message. Alternatively, the user may be prompted to allow the association of the image with the address book entry of the sender of the message. This way, the user's address book will be populated with images of people with whom the user is typically in contact.

In accordance with an aspect of the present application, there is provided a method of enhancing an electronic message. The method includes receiving an electronic message composed by a sending party and determining whether the electronic message includes a data-inclusion indicator, the indicator specifying that data specific to the sending party is to be included in the electronic message. The method further includes, if the electronic message includes a data-inclusion indicator, including the data specific to the sending party in the electronic message and transmitting the electronic message, with the data specific to the sending party included in the electronic message. Additionally, a mobile communication device is provided for carrying out this method and a computer readable medium is provided for containing instructions to allow a processor to carry out this method.

In accordance with another aspect of the present application, there is provided a method of handling an enhanced electronic message. The method includes receiving an electronic message composed by a sending party, the electronic message specifying a destination address for a receiving party and including data specific to the sending party and determining whether the data specific to the sending party has previously been transmitted to the destination address for the receiving party. The method further includes, if the data specific to the sending party has previously been transmitted to the destination address for the receiving party, amending the electronic message to remove the data specific to the sending party, thereby creating an amended electronic message and transmitting the amended electronic message toward the destination address for the receiving party.

In accordance with a further aspect of the present application, there is provided a method of handling an enhanced electronic message. The method includes receiving an electronic message composed by a sending party, the electronic message specifying a destination address for a receiving party and including data specific to the sending party, and determining whether the data specific to the sending party meets criteria specific to a device in use by the receiving party. The method further includes, if the data specific to the sending party fails to meet the criteria specific to the device in use by the receiving party, amending the data specific to the sending party to meet the criteria specific to the device in use by the receiving party, thereby creating an amended electronic message and transmitting the amended electronic message to the device in use by the receiving party.

Other aspects and features of the present application will become apparent to those of ordinary skill in the art upon review of the following description of specific embodiments of the application in conjunction with the accompanying figures.

Figure 1:
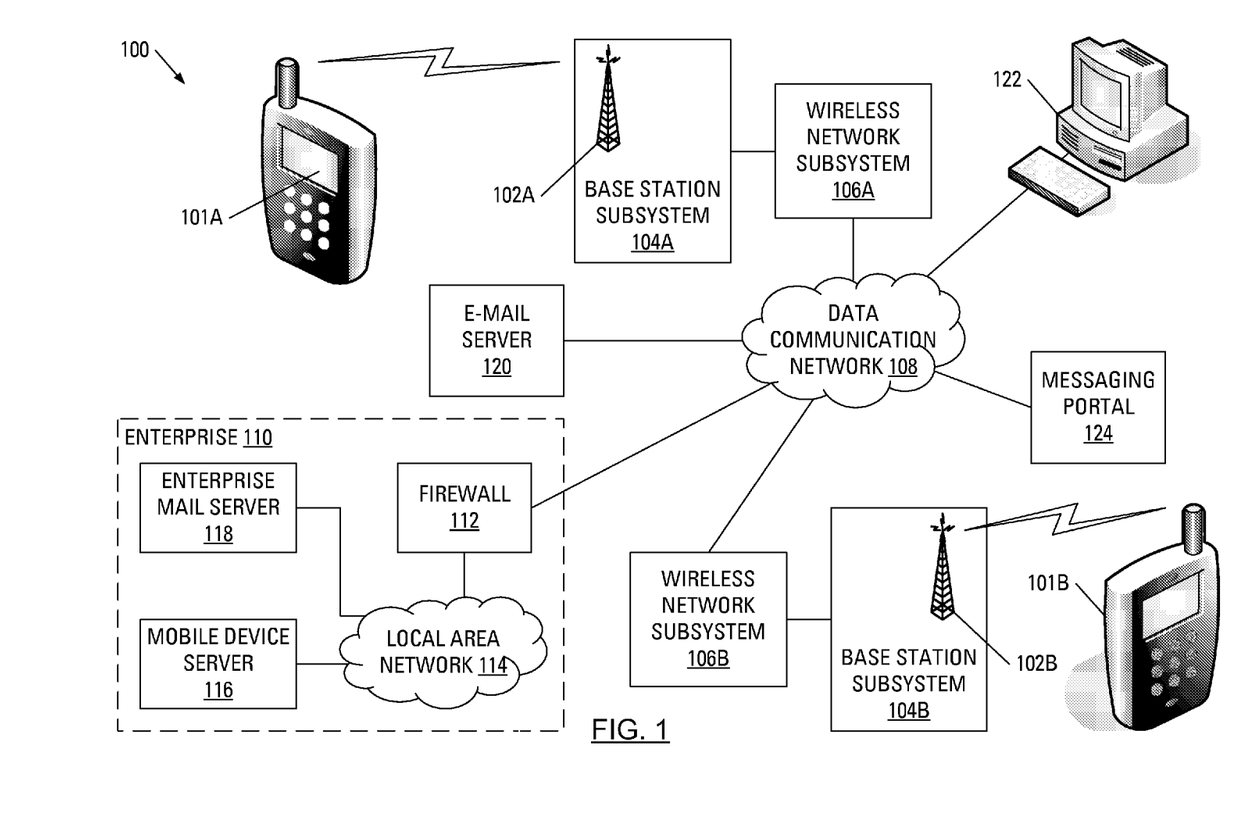
FIG. 1 illustrates elements of an exemplary network environment for a wireless mobile communication device, the exemplary network environment including a mobile device server.

FIG. 1 illustrates elements of an exemplary network environment 100 for a first wireless mobile communication device 101A. The elements of the exemplary network environment 100 include multiple wireless carrier networks and a data communication network 108, which may be considered to represent at least one wide area network, such as the present day Internet and successors, as well as, potentially, multiple local area networks. A first base station antenna 102A, with which the first wireless mobile communication device 101A may communicate wirelessly, is provided as part of a first base station subsystem 104A.

The first base station subsystem 104A connects to a first wireless network subsystem 106A. In an exemplary Global System for Mobile communications (GSM) implementation, the first wireless network subsystem 106A includes, among other components, a mobile services switching center, a home location register, a visitor location register, a relay and a Short Messaging Service Center (SMSC). As illustrated in FIG. 1, the first wireless network subsystem 106A is connected to the data communication network 108.

Also connected to the data communication network 108 is a second wireless network subsystem 106B. Similar to the first wireless network subsystem 106A, the second wireless network subsystem 106B may include a mobile services switching center, a home location register, a visitor location register, a relay and an SMSC. The second wireless network subsystem 106A connects to a second base station subsystem 104B with a second base station antenna 102B. The second base station antenna 102B may allow the second base station subsystem 104B to communicate wirelessly with a second mobile device 101B.

The first mobile device 101A may be associated with an enterprise 110 connected to the data communication network 108. The enterprise 110 may, for instance, include a firewall or proxy server 112 connecting to the data communication network 108 and to a local area network (LAN) 114. The LAN 114 may allow communication between a mobile device server 116 and an enterprise mail server 118.

Also connected to the data communication network 108 may be an e-mail server 120 and a desktop computer 122, which may be associated with a user having an account on the e-mail server 120. Also connected to the data communication network 108 may be a messaging portal 124.

Figure 2:
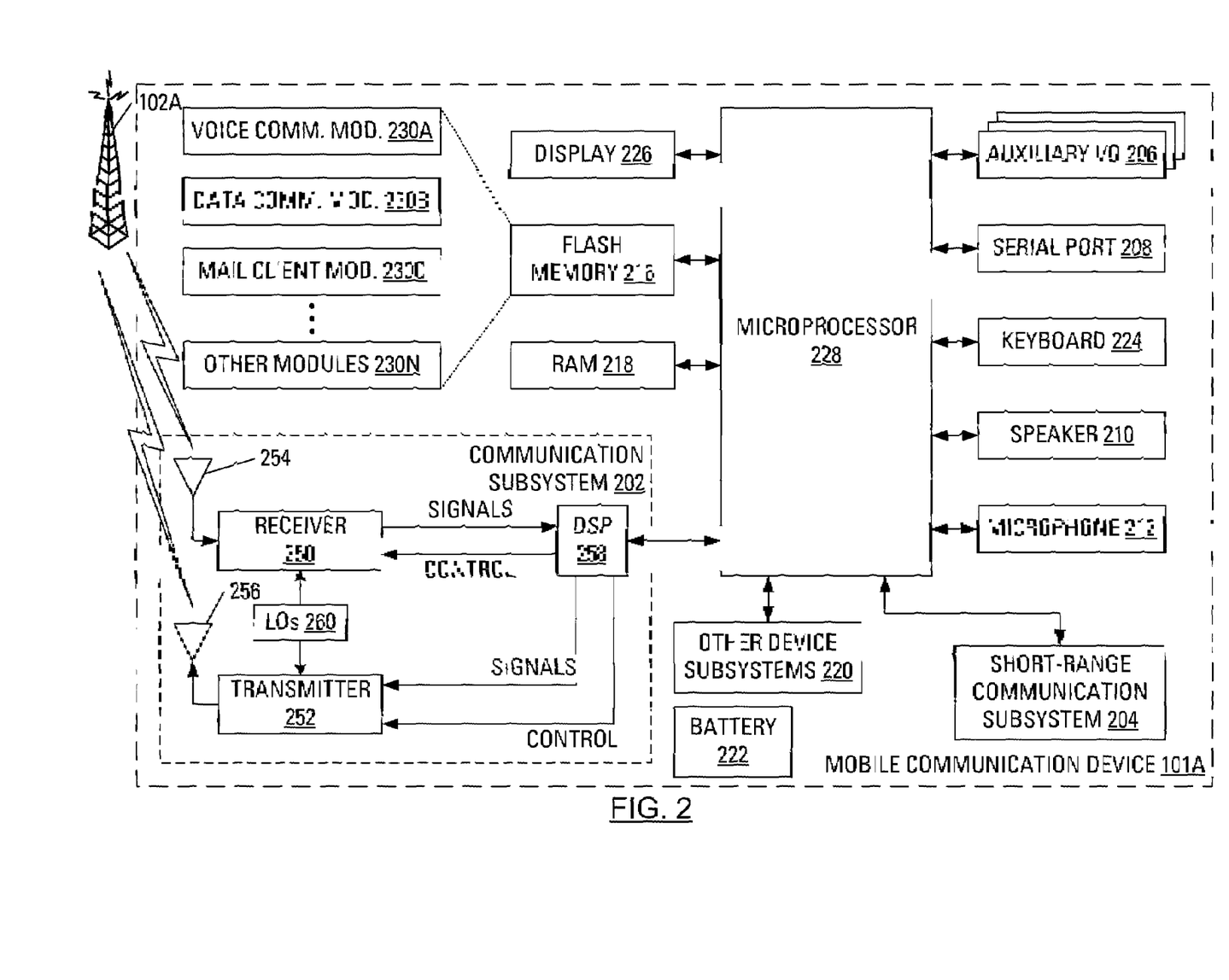
FIG. 2 illustrates components of the wireless mobile data communication device of FIG. 1, according to an embodiment of the present application.

FIG. 2 illustrates the first wireless mobile communication device 101A including a housing, an input device (a keyboard 224), and an output device (a display 226), which is preferably a full graphic or full color Liquid Crystal Display (LCD). Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the first mobile device 101A, in response to actuation of keys on the keyboard 224 by a user.

The housing may be elongated vertically, or may take on other sizes and shapes (including clamshell housing structures). The keyboard may include a mode selection key, or other hardware or software, for switching between text entry and telephony entry.

In addition to the microprocessor 228, other parts of the first mobile device 101A are shown schematically in FIG. 2. These include: a communications subsystem 202; a short-range communications subsystem 204; the keyboard 224 and the display 226, along with other input/output devices including a set of auxiliary I/O devices 206, a serial port 208, a speaker 211 and a microphone 212; as well as memory devices including a flash memory 216 and a Random Access Memory (RAM) 218; and various other device subsystems 220. The first mobile device 101A may have a battery 222 to power the active elements of the first mobile device 101A. The first mobile device 101A is preferably a two-way radio frequency (RF) communication device having voice and data communication capabilities. In addition, the first mobile device 101A preferably has the capability to communicate with other computer systems via the Internet.

Operating system software executed by the microprocessor 228 is preferably stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the first mobile device 101A. A predetermined set of software applications that control basic device operations, such as a voice communications module 230A and a data communications module 230B, may be installed on the first mobile device 101A during manufacture. An e-mail client application module 230C may also be installed on the first mobile device 101A during manufacture, to implement aspects of the application. As well, additional software modules, illustrated as an other software module 230N, which may be, for instance, a personal information manager (PIM) application, may be installed during manufacture. The PIM application is preferably capable of organizing and managing data items, such as e-mail messages, calendar events, voice mail messages, appointments, and task items. The PIM application is also preferably capable of sending and receiving data items via a wireless carrier network represented in FIG. 2 by the first base station antenna 102A. Preferably, the data items managed by the PIM application are seamlessly integrated, synchronized and updated via the wireless carrier network with the device user's corresponding data items stored or associated with a host computer system.

Communication functions, including data and voice communications, may be performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the first mobile device 101A is intended to operate. For example, the communication subsystem 202 of the first mobile device 101A may be designed to operate with the Mobitex™, DataTAC™ or General Packet Radio Service (GPRS) mobile data communication networks and may also be designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the first mobile device 101A.

When required network registration or activation procedures have been completed, the first mobile device 101A may send and receive communication signals over the wireless carrier network. Signals received from the first base station antenna 102A by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the base station antenna 102A are processed (e.g., modulated and encoded) by the DSP 258 and are then provided to the transmitter 252 for digital to analog conversion, frequency up conversion, filtering, amplification and transmission to the first base station antenna 102A via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as an SMS message or web page download, is processed by the communication subsystem 202 and is input to the microprocessor 228. The received signal is then further processed by the microprocessor 228 in preparation for output to the display 226, or alternatively to some other auxiliary I/O devices 206. A device user may also compose data items, such as e-mail messages or SMS messages, using the keyboard 224 and/or some other auxiliary I/O device 206, such as a touch-pad, a rocker switch, a thumb-wheel, or some other type of input device. The composed data items may then be transmitted to the base station antenna 102A via the communication subsystem 202.

In a voice communication mode, overall operation of the device is substantially similar to the data communication mode, except that received signals may be output to the speaker 211, and signals for transmission may be generated by the microphone 212. Alternative voice or audio I/O subsystems, such as a voice message recording subsystem, may also be implemented on the first mobile device 101A. In addition, the display 226 may also be utilized in voice communication mode, for example, to display the identity of a calling party, the duration of a voice call, or other voice call related information.

The short-range communications subsystem 204 enables communication between the first mobile device 101A and other proximate systems or devices, which need not necessarily be similar devices. For example, the short-range communications subsystem 204 may include an infrared device and associated circuits and components, or a Bluetooth™ communication module, to provide for communication with similarly-enabled systems and devices.

To create an outgoing message, it is typical for a user to interact with a user interface object (assuming the use of object-oriented programming techniques for the operational software code executed on the microprocessor 228). A new e-mail message object may be created as an instance of an e-mail message model class, which defines an organization of e-mail message payload, routing data and other metadata. The e-mail message model class may also identify those actions that may be performed on the e-mail message object, such as Send, Save Draft, etc. Such actions may be performed on the e-mail message object responsive to user interaction with the user interface object.

The actions that may be performed on an e-mail message object may be considered to relate to instances of "verb" classes that are specific to an e-mail message handling service that is external to the first mobile device 101A. As will be clear to a person of ordinary skill in the art of object oriented programming, a verb is an object encapsulation of an action in the Java™ programming language. A verb is often, but not necessarily, presented to the user as an item in a pull down menu or hotkey; a verb contains the code to perform the action on a related data model and information on how to represent itself to the user in zero or more ways.

An e-mail message Compose verb class may be associated with a default user interface screen object. Accordingly, while in view of the default user interface screen, a user may cause a menu to appear and may select a "Compose e-mail message" menu item. As a result of the selection of the "Compose e-mail message" menu item, the user interface object may instantiate the e-mail message Compose verb class.

Figure 3:
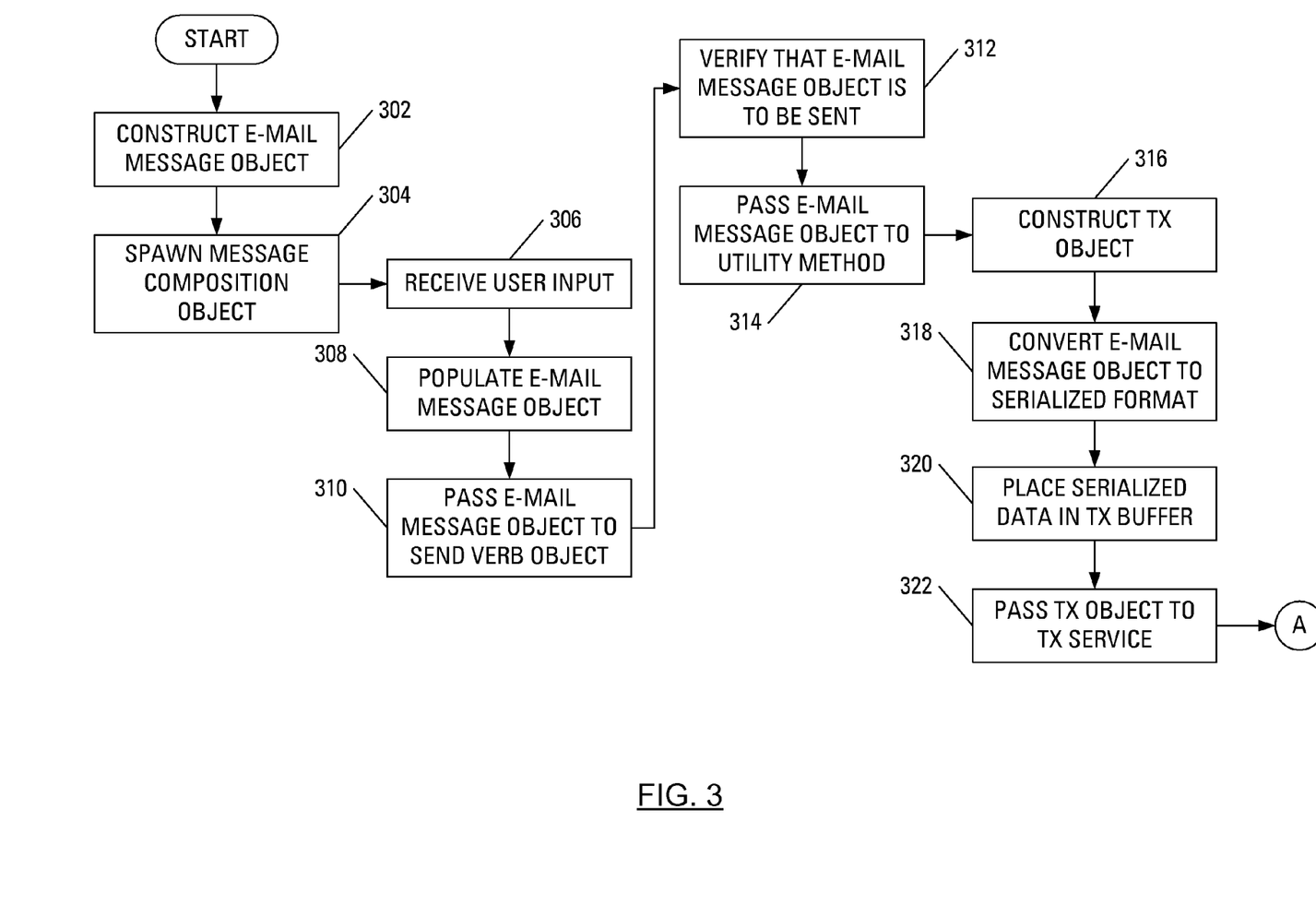
FIG. 3 illustrates steps carried out on the wireless mobile communication device by methods associated with an e-mail message Compose verb class in accordance with an embodiment.

Methods associated with the e-mail message Compose verb class, may then execute the steps illustrated in FIG. 3.

Initially, the e-mail message Compose verb object constructs (step 302) a new e-mail message object according, in part, to an e-mail message model class. A method of the e-mail message Compose verb object then spawns (step 304) an e-mail message composition screen object to the display 226 of the first mobile device 101A. The e-mail message composition screen object may have a number of fields. The fields are likely to include: a "To:" field, in which the user may specify an e-mail address for one or more primary recipients; a "CC:" field, in which the user may specify an e-mail address for one or more secondary recipients; a "Subject:" field, in which the user may specify a descriptive subject for the e-mail message in composition; and a "Body" field, in which the user may provide the payload of the e-mail message object.

In view of the e-mail message composition screen, the user may input, in the "To:" field, a destination e-mail address for the new e-mail message object. Additionally, the user may input, in the "Subject:" field, a subject for the new e-mail message object. Finally, the user may input, in the "Body" field, the text of the message that is intended to be relayed to the recipient associated with the destination e-mail address. The e-mail message composition screen object receives (step 306) this user input and uses the input to populate (step 308) the new e-mail message object.

As discussed above, the new e-mail message object may be associated with a "Send" action. As such, a "Send" menu item, associated with an e-mail message Send verb class, may appear in a menu caused to appear while the user is in view of the e-mail message composition screen. As a result of the selection of the "Send" menu item, the e-mail message composition screen object may instantiate the e-mail message Send verb class.

The e-mail message composition screen object then passes (step 310) the new e-mail message object to the e-mail message Send verb object. The e-mail message Send verb object verifies (step 312) that the new e-mail message object should be sent. In verifying that the new e-mail message object should be sent, the e-mail message Send verb object may check a policy to determine whether the user is allowed to send, may check a policy to determine whether the user is to be prompted before sending, may check that the destination e-mail addresses specified for the new e-mail message object are resolved, may check that that a password has been provided in the case of certain types of messages, etc. Upon determining that the new e-mail message should be sent, the e-mail message Send verb object passes (step 314) the new e-mail message object to a utility method.

Figure 4:
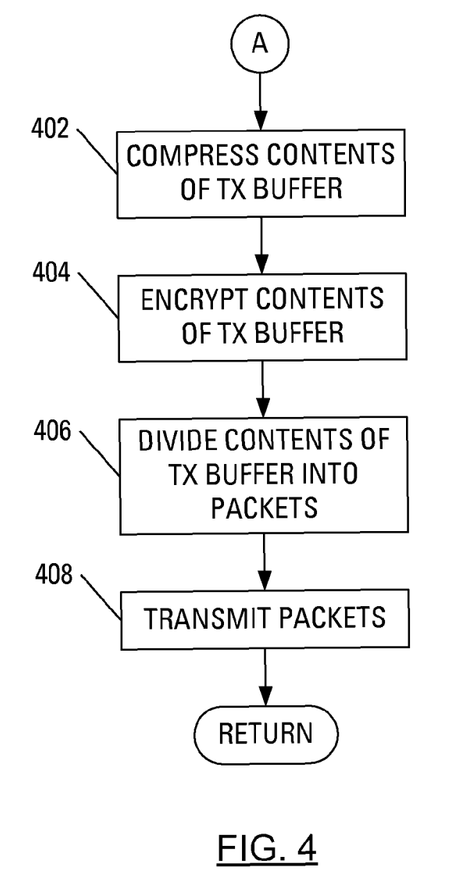
FIG. 4 illustrates additional steps carried out on the wireless mobile communication device by methods associated with an e-mail message Compose verb class in accordance with an embodiment.

This utility method then may call further methods on the e-mail message object. Among the further methods is a method that constructs (step 316) a transmission object based on the new e-mail message object. The transmission object contains various headers and parameters, as well as a transmission buffer. Another of the further methods converts (step 318) the e-mail message object into a serialized format and subsequently places (step 320) the serialized data in the transmission buffer of the transmission object. The e-mail utility method then passes (step 322) the transmission object to a transmission service. Responsive to being invoked by the e-mail utility method, the transmission service compresses (step 402, see FIG. 4) and encrypts (step 404) the contents of the transmission buffer. In other embodiments, the content can be transmitted in an unencrypted and/or uncompressed format. The transmission service then divides (step 406) the compressed and encrypted contents of the transmission buffer into packets and transmits (step 408) the packets from the device first mobile device 101A.

The packets transmitted from the first mobile device 101A are received over a wireless channel at the first base station antenna 102A at the first base station subsystem 104A. The first base station subsystem 104A passes the packets to the first wireless network subsystem 106A from which the packets are passed to a relay (not shown) in the data communication network 108. The relay recognizes that the packets must be sent to the mobile device server 116 and, accordingly, routes the packets to the enterprise 110. Within the enterprise 110, the packets pass through the firewall 112 and are routed through the LAN 114 to the mobile device server 116. The mobile device server 116 decrypts and decompresses the packets to reconstruct the e-mail message and then passes the reconstructed e-mail message through the LAN 114 to the enterprise mail server 118.

The enterprise mail server 118 considers the reconstructed e-mail message, in particular, to determine a value for at least one destination address provided as part of the e-mail message. The enterprise mail server 118 then transmits the e-mail message through the LAN 114 and the firewall 112 to the data communications network 108 toward an e-mail server associated with the e-mail destination address. For example, if the e-mail destination address of the e-mail message is associated with the e-mail server 120, the enterprise mail server 118 transmits the e-mail message to the e-mail server 120. Additionally, the enterprise mail server 118 may save a copy of the e-mail message in a "Sent Items" folder associated with the sender.

A user may subsequently execute a mail client application on the desktop computer 122. The mail client application may communicate with the e-mail server 120 to obtain e-mail messages addressed to the user.

In overview, while populating (step 308) the e-mail message object with, among other details, an e-mail address for a receiver, the e-mail message composition screen object includes an image of the sender as part of the e-mail message object. Advantageously, at a device in use to execute an e-mail client application on behalf of the receiver, the e-mail client application may automatically add the included image to an address book entry associated with the identity of the sender. Alternatively, the user may be prompted to allow the association of the image with the address book entry of the sender of the message. Later, upon receiving an incoming call from the sender with corresponding CLID information, the call display application may perform a lookup of the CLID information and display the image associated, in the address book, with the sender.

In a second embodiment, rather than include an image of the sender as part of the e-mail message object, while populating (step 308) the e-mail message object, the e-mail message composition screen object includes a data-inclusion indicator as part of the e-mail message object. The inclusion of an image in the e-mail message is performed away from the first mobile device 101A at the mobile device server 116.

Figure 5:
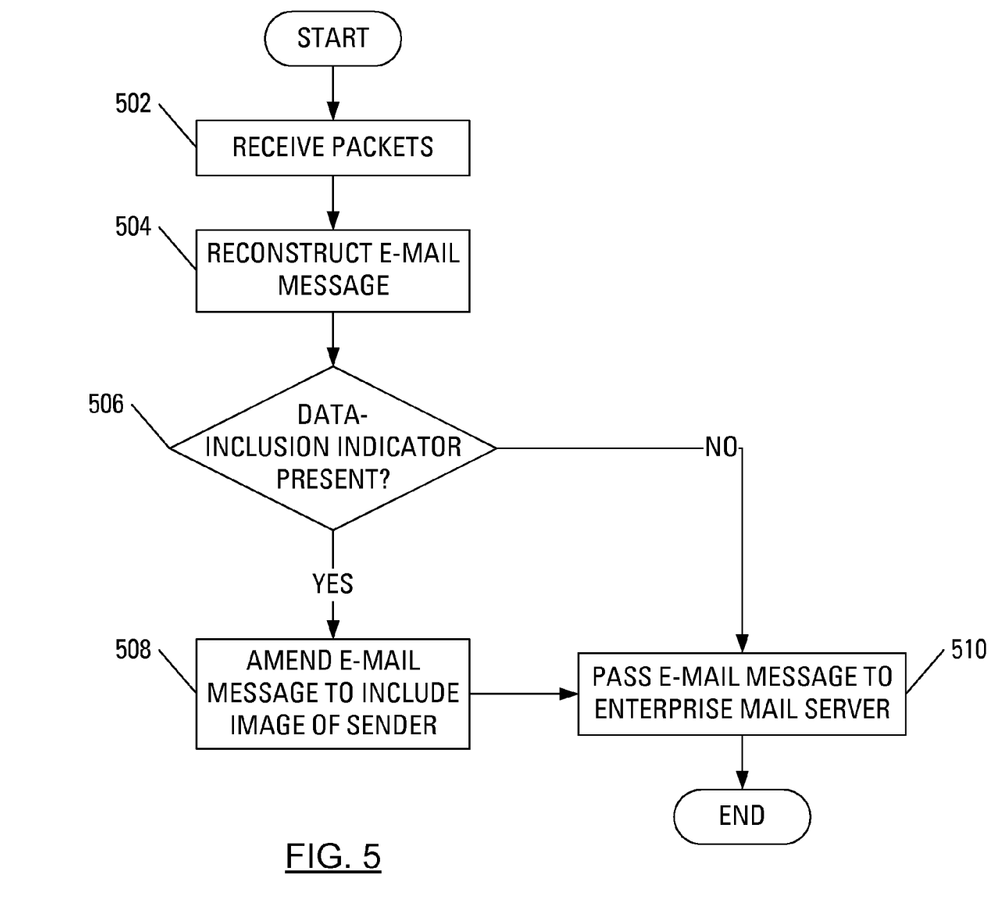
FIG. 5 illustrates steps carried out on the mobile device server in an exemplary method of handling an outgoing e-mail message in accordance with an embodiment.

In particular, as illustrated in FIG. 5, the mobile device server 116 receives (step 502) a transmission object, that is, packets that contain data defining an e-mail message, from the first mobile device 101A. From the received packets, the mobile device server 116 reconstructs (step 504) the e-mail message. Once the e-mail message has been reconstructed, the mobile device server 116 determines (step 506) whether a data-inclusion indicator is present in the e-mail message, i.e., whether the data-inclusion indicator has been included by the e-mail message composition screen object executed at the first mobile device 101A. Responsive to determining the presence of the data-inclusion indicator, the mobile device server 116 amends the e-mail message object to include an image of the sender. The mobile device server 116 then passes (step 510) the amended e-mail message object to the enterprise mail server 118 in a conventional fashion.

Upon determining that the data-inclusion indicator is not present, the mobile device server 116 simply passes (step 510) the e-mail message object to the enterprise mail server 118 in a conventional fashion.

Advantageously, in the second embodiment, the image is not part of the e-mail message object as the transmission object is transmitted wirelessly from the first mobile device 101A to the first base station subsystem 104A and, eventually, to the mobile device server 116. Accordingly, the wireless network resources that would normally be required to wirelessly transmit the image to the first base station subsystem 104A are conserved.

The Multipurpose Internet Mail Extension (MIME) standard is an Internet Standard that extends the format of e-mail messages to support: text in character sets other than US-ASCII; non-text attachments; multi-part message bodies; and header information in non-ASCII character sets. Wherever the e-mail message is amended to include the image, i.e., either at the first mobile device 101A or at the mobile device server 116, it is proposed herein to attach the image to the e-mail message as a MIME attachment. While there has not yet been developed a MIME Content-Type specific to an image of the sender, the document available at ietfreport.iso-c.org/idref/draft-ietf-asid-mime-vcard defines the profile of the MIME Content-Type for directory information for a white-pages person object, based on a vCard electronic business card. Furthermore, it is known that a vCard electronic business card may include a digital image.

As such, an image of the sender may be included as an element of a vCard electronic business card. The e-mail message composition screen object may then include the vCard electronic business card as part of the e-mail message object, thereby accomplishing the task of including an image in an e-mail message. In the second embodiment, it is the mobile device server 116 that includes the vCard electronic business card as part of the e-mail message object, thereby accomplishing the task of including an image in an e-mail message.

In conjunction with the development of the above-described manner of distributing images of senders along with outgoing e-mail messages, it is considered useful to consider the processing of a received e-mail message with an included image.

It is known that, upon receiving an e-mail message with an included vCard, a user of a receiving device may instruct the receiving device to associate the details provided in the vCard (including an image, if present) with an address book entry associated with the sender of the e-mail message. That is, the receiving device may populate the address book entry associated with the sender of the e-mail message with sender-specific details obtained from the vCard.

However, it is proposed herein to automatically associate contact details included in an incoming e-mail message with the address book entry associated with the sender of the e-mail message. Alternatively, the user may be prompted to allow the association of the image with the address book entry of the sender of the message.

Accordingly, the combination of automatically including, either at the first mobile device 101A or at the mobile device server 116, an image of the sender with an outgoing e-mail message and automatically populating the address book entry associated with the sender with the image received in the e-mail message provides an efficient manner by which to distribute digital images for associating with address book entries and for use with Picture Caller ID.

Thus far, the receiving device has been assumed to be connected to the data communication network 108 over a physical connection. See, for example, the combination of the desktop computer 122 and the e-mail server 120 in FIG. 1. Where the receiving device is another wireless communication device, say, second mobile device 101B (see FIG. 1), there may be incentive to reduce the volume of information transmitted over the wireless connection to the second mobile device 101B.

Figure 6:
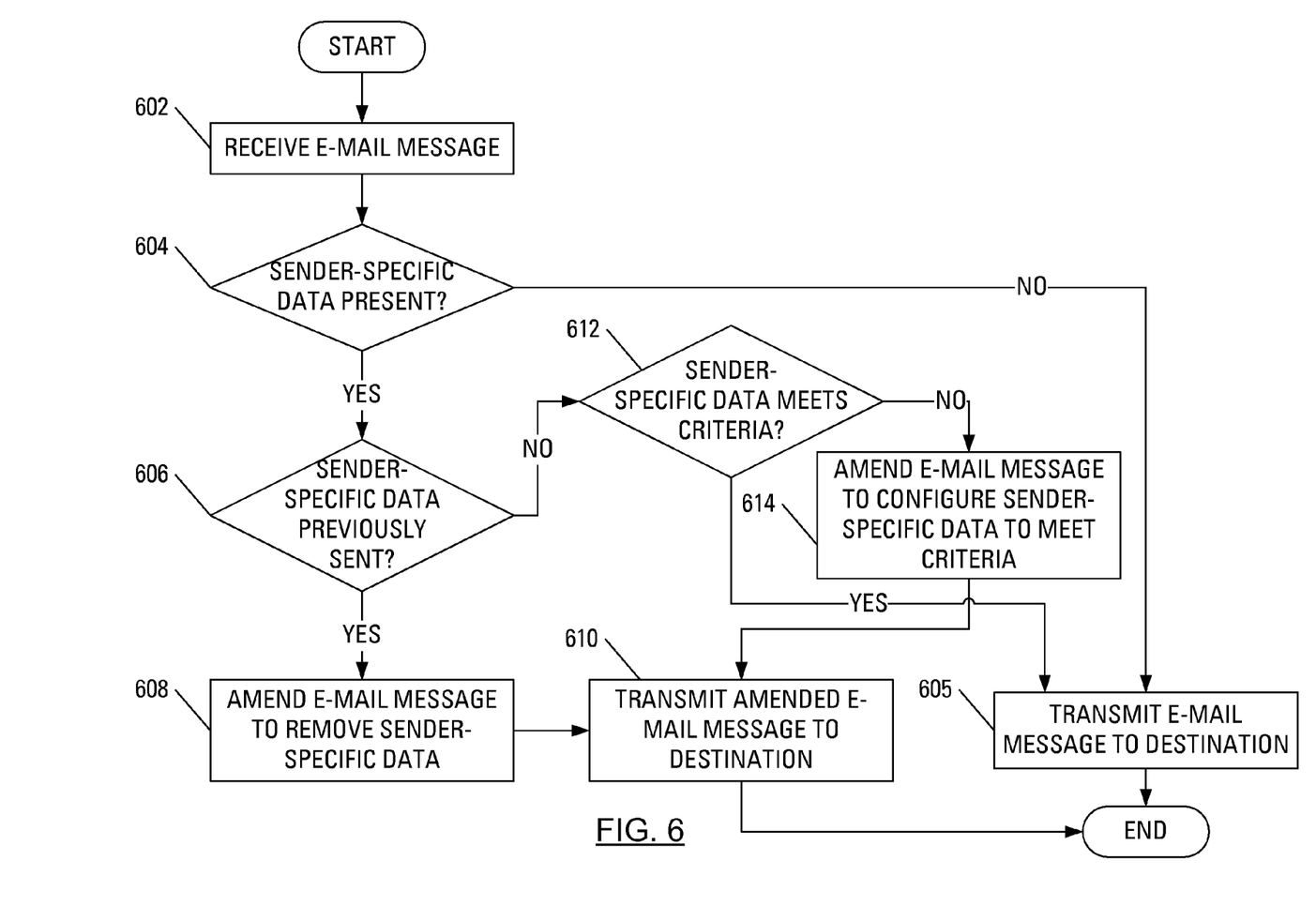
FIG. 6 illustrates steps carried out on the mobile device server in an exemplary method of handling an incoming e-mail message in accordance with an embodiment.

To that end, the mobile device server 116 may be considered to be associated with the second mobile device 101B and the second mobile device 101B may be associated with an e-mail account, the destination address for which has been specified in an e-mail message received by the enterprise mail server 118. The received e-mail message may have sender-specific data included, such as an image as described above. Exemplary steps in a method of handling such an e-mail message are illustrated in FIG. 6.

Initially, upon receiving (step 602) the e-mail message from the enterprise mail server 118, the mobile device server 116 analyzes (step 604) the received e-mail message to determine whether sender-specific data, e.g., an image, is present in the received e-mail message. Upon determining that sender-specific data is not present in the received e-mail message, that is, other than data typical to an e-mail message, such as the e-mail address of the sender and maybe some contact information in a signature portion of the text of the received e-mail message, the mobile device server 116 transmits (step 605) the received e-mail message to the second mobile device 101B.

Upon determining that sender-specific data is present in the received e-mail message, the mobile device server 116 determines (step 606) whether the sender-specific data has previously been transmitted to the second mobile device 101B. If, as determined (step 606) by the mobile device server 116, the sender-specific data has previously been transmitted to the second mobile device 101B, the mobile device server 116 amends the e-mail message to remove the sender-specific data to create an amended e-mail message. Once the mobile device server 116 has created the amended e-mail message, the mobile device server 116 transmits (step 610) the amended e-mail message to the second mobile device 101B.

Beneficially, the amended e-mail message is smaller than the e-mail message originally received and, consequently, is less taxing of the wireless bandwidth requirements between the second base station subsystem 104B and the second mobile device 101B.

If, as determined (step 606) by the mobile device server 116, the sender-specific data has not previously been transmitted to the second mobile device 101B, the mobile device server 116 determines (step 612) whether the sender-specific data meets criteria associated with the second mobile device 101B. Such criteria may include, where, for example, the sender-specific data is a digital image, height and width dimensions expressed in pixels. Such dimensional criteria may relate to the resolution of the display of the second mobile device 101B as it may be considered wasteful to send a digital image with a resolution greater than can be displayed by the second mobile device 101B. Other criteria associated with the second mobile device 101B may relate to the structure of contact data maintained at the second mobile device 101B. For instance, it may be that the sender-specific data is a vCard and the vCard includes a web site address for the company with which the sender is associated. It may also be that individual contact records maintained by the contact management software at the second mobile device 101B do not have a field for the web site address.

If, as determined (step 612) by the mobile device server 116, the sender-specific data meets criteria associated with the second mobile device 101B, the mobile device server 116 transmits (step 605) the received e-mail message to the second mobile device 101B.

If, however, the sender-specific data does not meet criteria associated with the second mobile device 101B, the mobile device server 116 amends (step 614) the sender-specific data to meet the criteria, thereby creating an amended e-mail message. Once the mobile device server 116 has created the amended e-mail message, the mobile device server 116 transmits (step 610) the amended e-mail message to the second mobile device 101B.

Amending (step 614) the sender-specific data to meet the criteria associated with the second mobile device 101B may involve, for example, cropping a digital image to an appropriate size for display on the second mobile device 101B. It is recognized that indiscriminate cropping may lead to a digital image that is of no use in recognizing the sender at a later time. As such, amending (step 614) the sender-specific data to meet the criteria associated with the second mobile device 101B may involve, for example, resizing a digital image to an appropriate size for display on the second mobile device 101B. When the source image is, for example, 320 pixels by 320 pixels and the resolution of the display on the second mobile device 101B is 160 pixels by 160 pixels, cropping may involve removing 80 lines of pixels from the top, bottom, left and rights sides, while resizing may involve discarding every other vertical line of pixels and every other horizontal line of pixels, to reach the desired image size.

In the case where the sender-specific data is a vCard and the vCard includes particular data for which no field exists in the individual contact records maintained by the contact management software at the second mobile device 101B, amending (step 614) the sender-specific data may involve remapping the particular data to another field, such as a generic "Notes" field.

The above-described embodiments of the present application are intended to be examples only. Alterations, modifications and variations may be effected to the particular embodi-

What is claimed is:

1. A method of handling an enhanced electronic message, said method comprising:
 receiving an electronic message composed by a sending party, said electronic message specifying a destination address for a receiving party and including a message attachment specific to said sending party;
 determining that said message attachment specific to said sending party fails to meet criteria, said criteria including descriptions of a first set of fields of a contact record maintained by contact management software executed at a device in use by said receiving party;
 responsive to said determining, amending said message attachment specific to said sending party to meet said criteria thereby creating an amended electronic message; and
 transmitting said amended electronic message to said device in use by said receiving party,
 wherein said amending said message attachment specific to said sending party comprises remapping data in a second set of fields of said data specific to said sending party to said first set of fields.

2. The method of claim 1 wherein said message attachment specific to said sending party is a digital image.

3. The method of claim 2 wherein said criteria further comprise dimensions of said digital image.

4. The method of claim 3 wherein said amending said message attachment specific to said sending party comprises cropping said digital image.

5. The method of claim 3 wherein said amending said message attachment specific to said sending party comprises resizing said digital image.

6. A mobile device server comprising:
 a processor adapted to:
  receive an electronic message composed by a sending party, said electronic message specifying a destination address for a receiving party and including a message attachment specific to said sending party;
  determine that said message attachment specific to said sending party fails to meet criteria, said criteria including descriptions of a first set of fields of a contact record maintained by contact management software executed at a device in use by said receiving party;
  amend, responsive to said determining, said message attachment specific to said sending party to meet said criteria, to thereby create an amended electronic message; and
  transmit said amended electronic message to said device in use by said receiving party,
  wherein said processor is further adapted to amend said message attachment specific to said sending party by remapping message attachment in a second set of fields of said message attachment specific to said sending party to said first set of fields.

7. The mobile device server of claim 6 wherein said message attachment specific to said sending party is a digital image.

8. The mobile device server of claim 7 wherein said criteria further comprise dimensions of said digital image.

9. The mobile device server of claim 8 wherein said processor is further adapted to amend said message attachment specific to said sending party by cropping said digital image.

10. The mobile device server of claim 8 wherein said processor is further adapted to amend said message attachment specific to said sending party by resizing said digital image.

11. A non-transitory computer readable medium containing computer-executable instructions that, when performed by a processor, cause said processor to:
 receive an electronic message composed by a sending party, said electronic message specifying a destination address for a receiving party and including message attachment specific to said sending party;
 determine that said message attachment specific to said sending party fails to meet criteria, said criteria including descriptions of a first set of fields of a contact record maintained by contact management software executed at a device in use by said receiving party;
 amend, responsive to said determining, said message attachment specific to said sending party to meet said criteria, to thereby create an amended electronic message; and
 transmit said amended electronic message to said device in use by said receiving party,
 wherein said instructions further cause said processor to amend said message attachment specific to said sending party by remapping data in a second set of fields of said message attachment specific to said sending party to said first set of fields.

12. The non-transitory computer readable medium of claim 11 wherein said message attachment specific to said sending party is a digital image.

13. The non-transitory computer readable medium of claim 12 wherein said criteria further comprise dimensions of said digital image.

14. The non-transitory computer readable medium of claim 12 wherein said instructions further cause said processor to amend said message attachment specific to said sending party by cropping said digital image.

15. The non-transitory computer readable medium of claim 12 wherein said instructions further cause said processor to amend said message attachment specific to said sending party by resizing said digital image.

* * * * *